No. 867,237. PATENTED OCT. 1, 1907.
Z. M. BONNER.
WHEEL BRACE.
APPLICATION FILED DEC. 29, 1906.

Witnesses
Inventor
Zeddie M. Bonner
By
Attorneys

UNITED STATES PATENT OFFICE.

ZEDDIE MARION BONNER, OF VALDOSTA, GEORGIA.

WHEEL-BRACE.

No. 867,237.  Specification of Letters Patent.  Patented Oct. 1, 1907.

Application filed December 29, 1906. Serial No. 349,997.

*To all whom it may concern:*

Be it known that I, ZEDDIE MARION BONNER, a citizen of the United States, residing at Valdosta, in the county of Lowndes and State of Georgia, have invented certain new and useful Improvements in Wheel-Braces, of which the following is a specification.

This invention is a brace for vehicle-wheels, and has for its object to provide a simple and efficient device of this kind for strengthening the wheel and keeping the spokes tight.

A further object is to provide a brace which can be readily attached to an ordinary wooden wheel, no special construction being required.

Figure 2:
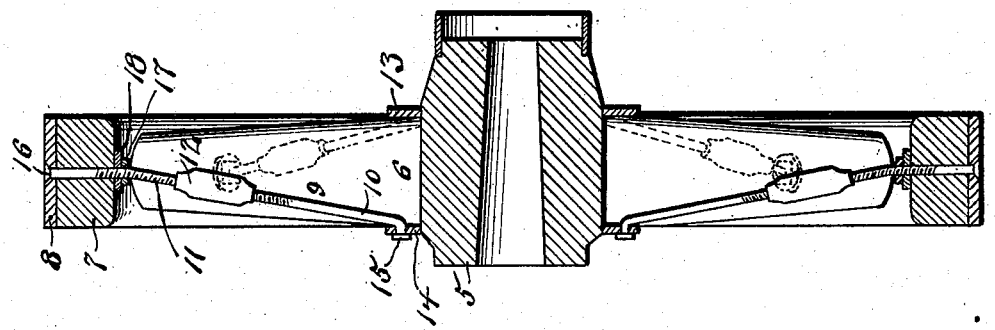
Figure 1:
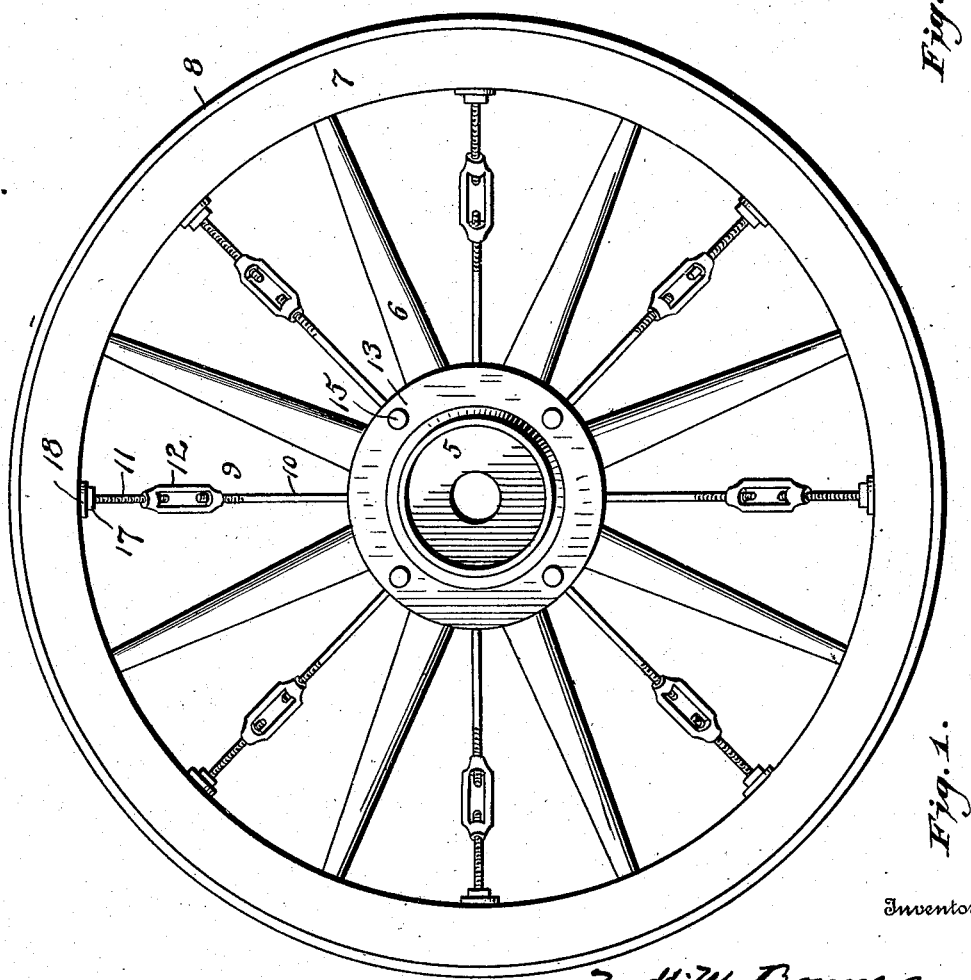

In the accompanying drawing, Figure 1 is an elevation of a wheel showing the application of the invention. Fig. 2 is a vertical sectional view.

Referring specifically to the drawing, 5 denotes the hub; 6, the spokes; 7, the rim; and 8, the metal tire of a wheel.

The attachment comprises a series of radial brace-rods 9 which extend between the hub and the rim of the wheel. Each brace-rod comprises sections 10 and 11, respectively, which are threaded and connected by turn-buckles 12. The hub 5, on both sides of the spokes, is fitted with disks 13 and 14, respectively, to which the inner ends of the sections 10 are connected alternately, said connection being made by bending the sections laterally and passing the laterally extending portions through openings in the disks. On the outside of the disks the ends of the sections are provided with retaining heads 15. The outer ends of the brace-rod sections 11 are connected to the rim and tire of the wheel, said rim and tire having central openings through which the sections extend. The openings in the tire are countersunk to receive retaining heads 16 on the outer ends of the sections 11. Adjacent to the rim the sections 11 are threaded to receive nuts 17, and between the latter and the inner side of the rim are washers 18.

As the brace-rods extend inwardly to the rim from the hub on opposite sides of the spokes the disks 14 will be drawn tightly against the spokes when the turn-buckles are screwed up and the latter also serve to tighten the spokes by drawing the rim and tire against the outer ends thereof. Upon screwing up the nuts 17 the rim and tire will be tightly clamped together.

The attachment herein described can be readily fitted on any ordinary wooden wheel, no specially constructed wheel being required, and by its use the wheel will be greatly strengthened and all its parts can be tightened to take up wear.

I claim:—

1. An attachment for vehicle wheels comprising disks mounted on the wheel hub on opposite sides of the spokes and in contact therewith, sectional brace-rods alternately secured at one end to the disks, and at the other end to the rim, and turn-buckles connecting the sections.

2. An attachment for vehicle-wheels comprising disks mounted on the wheel hub on opposite sides of the spokes and in contact therewith, sectional brace-rods alternately secured at one end to the disks, and extending at the other end through the rim and secured to the tire, clamping nuts on the sections engageable with the inner side of the rim, and turn-buckles connecting the sections.

3. An attachment for vehicle-wheels comprising disks mounted on the wheel-hub on opposite sides of the spokes and in contact therewith, sectional brace-rods secured at one end to the disks and at the other end to the rim, means for clamping the rim and tire together, and turn-buckles connecting the sections.

In testimony whereof I affix my signature, in presence of two witnesses.

ZEDDIE MARION BONNER.

Witnesses:
W. A. SIMMS,
A. V. SIMMS.